United States Patent
McKay et al.

(10) Patent No.: US 8,140,573 B2
(45) Date of Patent: Mar. 20, 2012

(54) EXPORTING AND IMPORTING BUSINESS OBJECTS BASED ON METADATA

(75) Inventors: Michael S. McKay, Round Rock, TX (US); Georg Ochs, Moetzingen (DE); Jeremias Werner, Ehningen (DE)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 12/484,331

(22) Filed: Jun. 15, 2009

(65) Prior Publication Data

US 2010/0318556 A1 Dec. 16, 2010

(51) Int. Cl.
*G06F 7/00* (2006.01)
*G06F 17/30* (2006.01)

(52) U.S. Cl. ......... 707/778; 707/797; 707/829; 707/956

(58) Field of Classification Search .................. 707/759, 707/769, 797, 803, 805, 778, 829, 956
See application file for complete search history.

(56) References Cited

U.S. PATENT DOCUMENTS

| | | | | |
|---|---|---|---|---|
| 6,732,109 | B2 * | 5/2004 | Lindberg et al. | 707/797 |
| 6,947,945 | B1 | 9/2005 | Carey et al. | |
| 7,318,063 | B2 | 1/2008 | Brychell et al. | |
| 7,873,678 | B2 * | 1/2011 | Tonev et al. | 707/805 |
| 7,899,820 | B2 * | 3/2011 | Nagoski et al. | 707/736 |
| 7,937,410 | B2 * | 5/2011 | Steinmaier et al. | 707/802 |
| 2006/0230044 | A1 * | 10/2006 | Utiger | 707/10 |
| 2007/0083543 | A1 * | 4/2007 | Chen | 707/102 |
| 2009/0164497 | A1 * | 6/2009 | Steinmaier et al. | 707/102 |

* cited by examiner

*Primary Examiner* — Phong Nguyen
(74) *Attorney, Agent, or Firm* — Stephen R. Tkacs; Stephen J. Walder, Jr.; Jeffrey S. LaBaw

(57) ABSTRACT

A metadata file can be automatically generated based on a database instance and a user defined maximum depth. The relationships between data objects that constitute a business object may be visualized in a tree. The maximum depth limits the number of levels in the tree to traverse. A metadata file describes the structure of a business object and relationships between sets of data objects that constitute the business object. The structure defined in the metadata file can be used to export instances of the business object from the database. The exported business object instances can be imported to another database.

18 Claims, 13 Drawing Sheets

EXPORTING AND IMPORTING BUSINESS OBJECTS BASED ON METADATA

BACKGROUND

Embodiments of the inventive subject matter generally relate to the field of information technology service management, and, more particularly, to exporting and importing business objects based on metadata.

Solutions based on a relational database schema, such as information technology (IT) service management solutions comprise a business logic layer on top of a data layer. The data layer organizes and maintains the storage and access of stand-alone data objects. The business layer defines the structure of a plurality of business objects. Business objects comprise a set of interrelated data object types and a specific logical behavior.

SUMMARY

Embodiments include a method directed to detecting an indication to create a metadata file for a business object in the database. In some embodiments, the metadata file can describe the hierarchical structure of interrelated data object types that constitute the business object and relationships between the data object types. A parent data object type of the business object and a maximum depth can be determined. The maximum depth can represent a maximum level of the hierarchical structure for which metadata should be collected. Metadata of the parent data object type can be collected. The metadata of the parent data object type can be written to the metadata file. If the maximum depth has not been reached, a plurality of children data object types can be determined. Metadata of the children data object types can be collected. The metadata of the children data object types can be written to the metadata file.

BRIEF DESCRIPTION OF THE DRAWINGS

The present embodiments may be better understood, and numerous objects, features, and advantages made apparent to those skilled in the art by referencing the accompanying drawings.

FIG. 3 depicts a flowchart of example operations for generating a metadata file based on the relationships between data object types that constitute a business object.

FIG. 5 depicts a flowchart of example operations for exporting a business object based on metadata.

FIG. 8 depicts a flowchart of example operations for importing business object instances into a database.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to Extensible Markup Language (XML), embodiments can be implemented using other markup languages, such as Standard Generalized Markup Language (SGML). In other instances, well-known instruction instances, protocols, structures, and techniques have not been shown in detail in order not to obfuscate the description.

IT service management solutions include large amounts of information that is used for business activities and business decision making. Accessibility of information is crucial to specific business applications such as data mining, analytics, reporting, etc. When developing IT service management solutions, service teams analyze business scenarios and use cases to create customized solutions matching business needs. Extracting customizations in a controlled and reproducible manner can be difficult. A metadata file can be automatically generated based on a database instance and a user defined maximum depth. The relationships between data objects that constitute a business object may be visualized in a tree. The maximum depth limits the number of levels in the tree to traverse. A metadata file describes the structure of a business object and relationships between sets of data objects that constitute the business object. The structure defined in the metadata file can be used to export instances of the business object from the database. The exported business object instances can be imported to another database.

Figure 1:
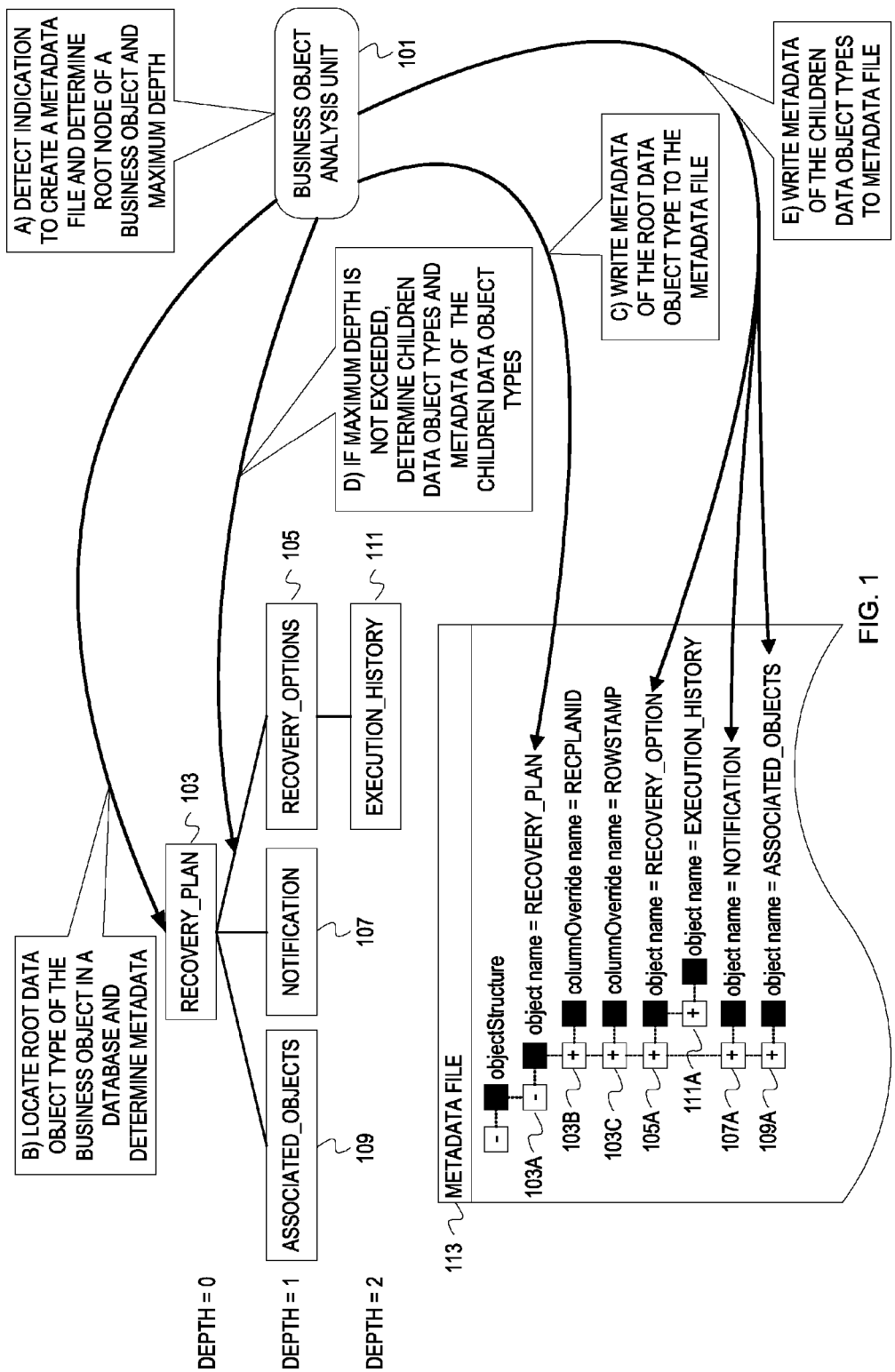
FIG. 1 is an example conceptual diagram of creating a metadata file based on the relationships between data object types comprising a business object.

FIG. 1 is an example conceptual diagram of creating a metadata file based on the relationships between data object types that constitute a business object. A data object type defines the attributes of data object instances. For example, an inventory data object type may define attributes such as an inventory number, an item name, a purchase price, a cost, etc. Data object types correspond to tables in a database. Each table contains data object instances. Business objects comprise collections of interrelated data object types. In FIG. 1, a business object comprises data object types "recovery_plan" 103, "recovery_options" 105, "notification" 107, "associated_objects" 109, and "execution_history" 111. The business object is depicted as a graph of a tree for visualization purposes. Each node in the tree is a data object type 103, 105, 107, 109, and 111 that represents a table in a database. The structure of the tree represents the relationships between the tables in the database.

At stage A, a business object analysis unit 101 detects an indication to create a metadata file and determines a root node of a tree structure that represents the business object and determines a maximum depth for traversal of the tree structure. For example, a database command can be executed, which indicates that the metadata file should be created. Inputs to the database command can include a business object name and a maximum depth. The root node comprises the main data object type in the business object. In this example, the root node is the "recovery_plan" data object type 103. The maximum depth limits the number of levels in the tree to traverse. If the depth of a node representing a data object type in the tree is greater than the maximum depth, metadata is not collected for that node. In this example, the "recovery_plan" data object type 103 is at a depth of zero. The data object types "recovery_options" 105, "notification" 107, and "associated_objects" 109 are at a depth of one. The "execution_history" data object type 111 is at a depth of two.

At stage B, the business object analysis unit 101 locates the root data object type 103 of the business object in the database and determines metadata of the root data object type 103 associated with the root node. Metadata defines the structure of a business object and the relationships between a set of data object types that constitute the business object. Examples of metadata include names, locations in the database, key columns, override columns, relationships, extensions, etc. Key columns specify which attributes (i.e., columns in a table) uniquely name data object instances. Key columns are used to determine if two data object instances are equal. For example, two data object instances in two different databases have the same values in their key column attributes, so the data object instances are considered to be the same. Override columns contain unique values (e.g., sequences of numbers, random hash keys, etc.) for each unique data object instance in a database. Extensions indicate one or more script files to be run before or after importing a business object instance into a database.

At stage C, the business object analysis unit 101 writes metadata of the root data object type 103 to a metadata file 113. The metadata file 113 can be an XML file. FIG. 1 depicts a parsed version of the metadata file 113 that may be presented by an XML reader. In this example, metadata of the "recovery_plan" data object type 103 include a name 103A, a columnOverride name "recplanid" 103B and a columnOverride name "rowstamp" 103C.

At stage D, the business object analysis unit 101 determines children data object types of the root data object type if the maximum depth has not been exceeded. A data object type is a child if relationship metadata indicates the root data object type as a parent. The business object analysis unit also determines metadata of the children data object types. In this example, the children data object types are "recovery_options" 105, "notification" 107, and "associated_objects" 109.

At stage E, the business object analysis unit 101 writes metadata of the children data object types "recovery_options" 105, "notification" 107, and "associated objects" 109 to the metadata file 113. Although not shown, the metadata for children data object types "recovery_options" 105, "notification" 107, and "associated objects" 109 also include two columnOverride names.

Stages D and E are repeated for children data object types of the data object types "recovery_options" 105, "notification" 107, and "associated objects" 109. The "recovery_options" data object type 105 has one child data object type "execution_history" 111. The data object types "notification" 107, and "associated objects" 109 do not have any children.

The machine instructions for generating metadata files is based on a depth-first-search algorithm. As depicted in FIG. 1, a data structure that represents a business object comprises data object types and their relationships. Beginning from a root data object type, execution of the metadata file generating machine instructions causes recursive traversal of the business object data structure until a maximum depth has been reached. For each data object type visited, the metadata file generating machine instructions create an entry in the metadata file containing the metadata. The executing metadata file generating machine instructions then cause processing of children data objects types. The metadata file generating machine instructions generate entries in the metadata file representing the graph of interrelated data objects that constitute a business object. The metadata file generating machine instructions process the data structure representing the business object in preorder starting at the root data object type. Preorder means, that the root data object type is processed before its children data object types.

Figure 2:
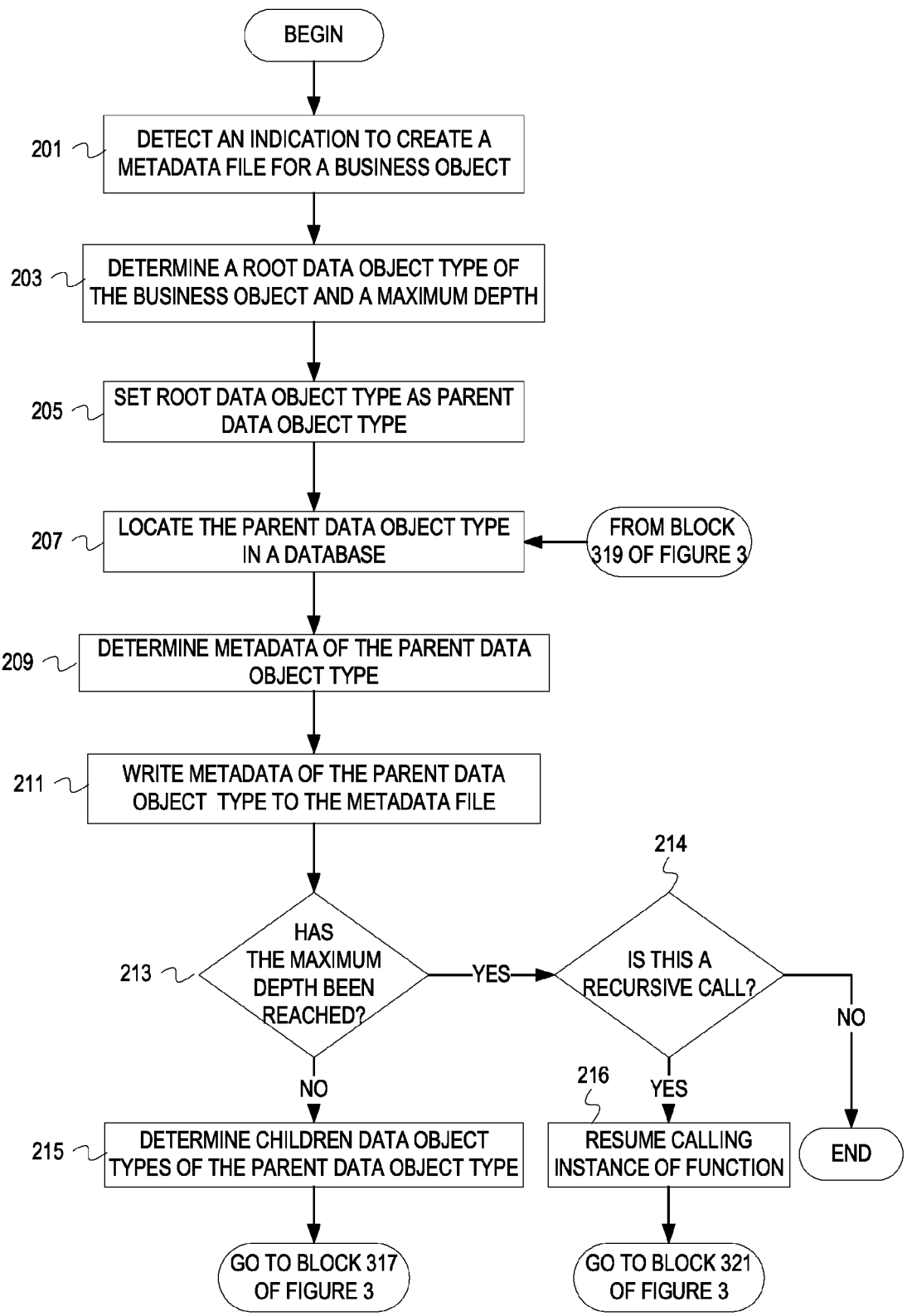
FIGS. 2 and 3 depict a flowchart of example operations for generating a metadata file based on the relationships between data object types that constitute a business object.
Figure 3:
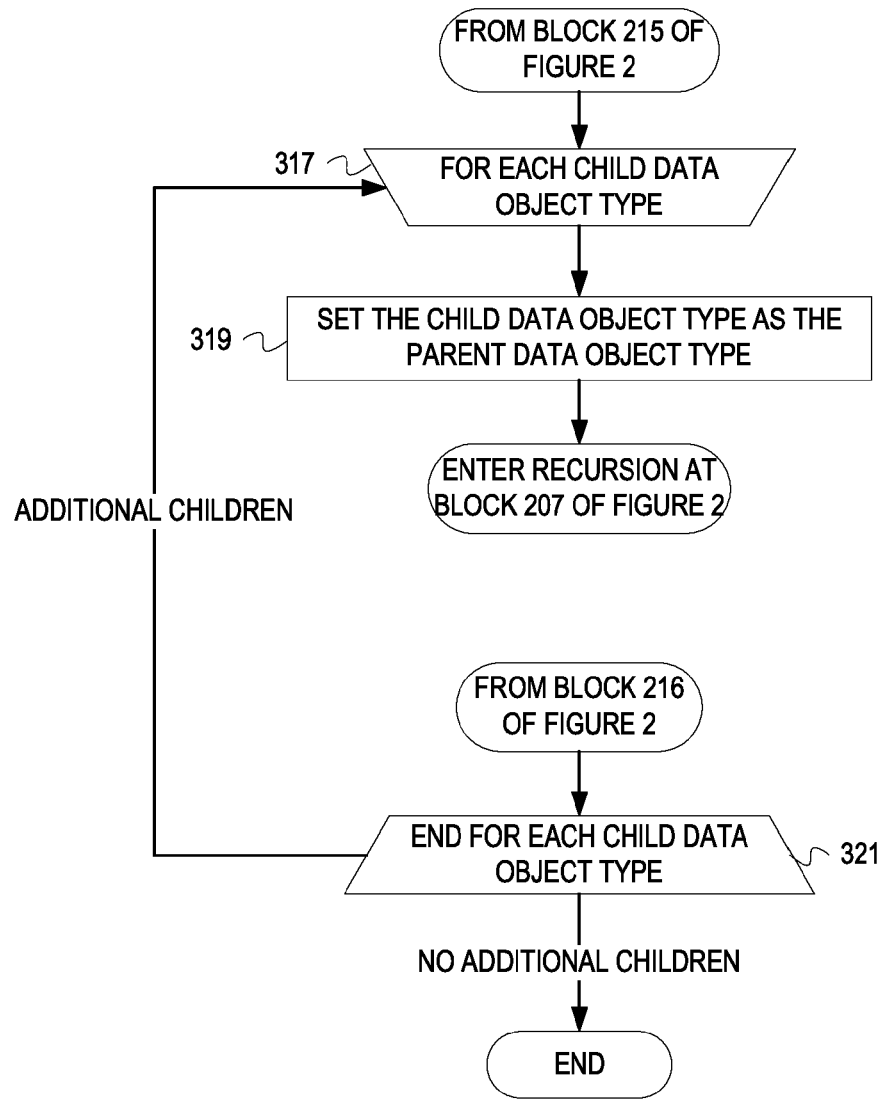

FIGS. 2 and 3 depict a flowchart of example operations for generating a metadata file based on the relationships between data object types that constitute a business object. Flow begins at block 201, where an indication to create a metadata file for a business object is detected. Examples of detecting an indication include executing a database command, completing a create metadata wizard, clicking a button, etc. Flow continues at block 203.

At block 203, a root data object type of the business object and a maximum depth are determined. For example, a name of the root data object type and the maximum depth can be determined based on user input in a create metadata wizard. As another example, the name of the root data object type and maximum depth are determined from a script file. Flow continues at block 205.

At block 205, the root data object type is set as a parent data object type. Flow continues at block 207.

At block 207, the parent is located in a database. Data object types correspond to tables containing data object instances in the database. The parent can be located based on a specified name of the parent data object type. Flow continues at block 209.

At block 209, metadata of the parent is determined. Metadata may include a name of the database table corresponding to the parent, relationships to other data object types, key columns, and override columns, etc. Flow continues at block 211.

At block 211, metadata of the parent data object type is written to the metadata file. Flow continues at block 213.

At block 213, it is determined if the maximum depth has been reached. If the maximum depth has not been reached, flow continues at block 215. If the maximum depth has been reached, flow continues at block 214.

At block 214, it is determined if this is a recursive call. If this is not a recursive call, flow ends. If this is a recursive call, flow continues at block 216.

At block 216, the calling instance of the function is resumed and flow continues at block 321 of FIG. 3.

At block 215, children data object types of the parent are determined. Determining the children data object types comprises searching the database for children data object types. For example, a first data object type is a child of a second data object type if the relationship metadata of the first data object type references the second data object type as the parent. As another example, the first data object type is a child of the second data object type if relationship metadata of the second data object type references the first data object type as a child. Relationship metadata may be determined by analyzing foreign keys and/or indexes of the parent and/or children data object types, analyzing metadata of an industry solution, analyzing a definition of the relationships, etc. Flow continues at block 317 of FIG. 3.

FIG. 3 depicts a flowchart of example operations for generating a metadata file based on the relationships between data object types that constitute a business object. Flow continues from FIG. 2 at block 317, where a loop begins for each child data object type. Flow continues at block 319.

At block 319, the child is set as the parent. The function enters a recursive call at block 207 of FIG. 2.

At block 321, the loop for each child data object type ends. Flow returns to block 317 if there are additional children. Flow ends if there are not additional children.

A metadata file contains the structure of a business object and can be used to export business object instances from a database. Data object instances should be exported from a database based on entries in the metadata file representing data object types. Different metadata files can be generated for exporting business object instances in different situations. Referring to FIG. 1, the business object comprises data object types "recovery_plan" 103, "recovery_options" 105, "notification" 107, "associated_objects" 109, and "execution_history" 111. It may be useful to export "execution_history" 111 data object instances for test purposes, but it may not be desirable to export "execution_history" 111 instances for customer release purposes. Different metadata files may be generated for test and customer releases purposes. In this example, the metadata files would be generated based on different maximum depths. The maximum depth for test purposes would be two and the maximum depth for customer release would be one.

In addition, a metadata file may be adjusted by a user for a specific purpose. For example, a metadata file may have been generated up to a fourth level of data object types in a business object. However, one of the data object types at the fourth level corresponds to development test results. When exporting a business object instance from the metadata file for delivery to a customer, the development team may not wish to include the development test results. So, a developer may remove the metadata for the development test results data object type from the metadata before performing an export. The developer may remove metadata manually or automatically (e.g., by running a script).

Figure 4:
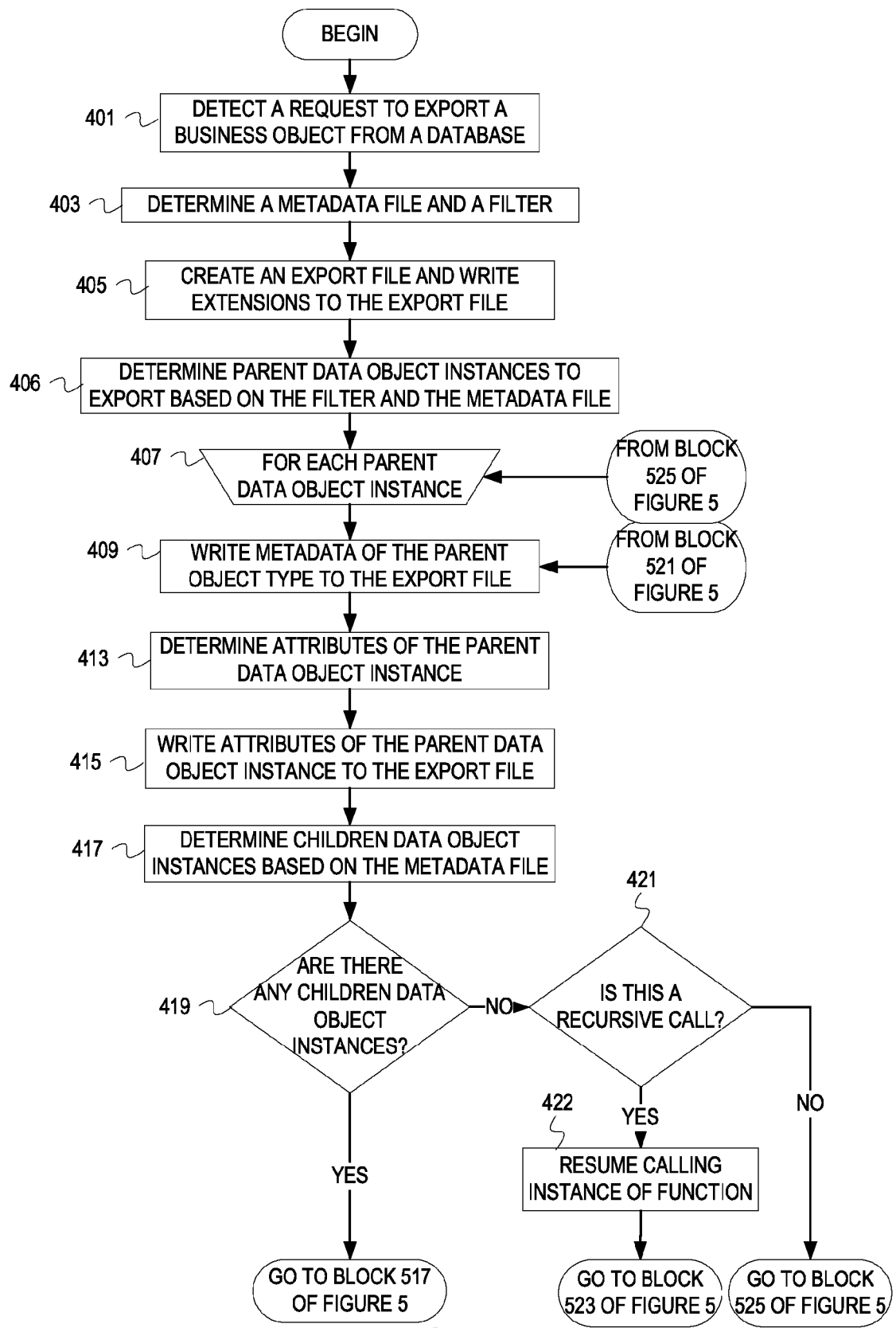
FIGS. 4 and 5 depict a flowchart of example operations for exporting a business object based on metadata.
Figure 5:
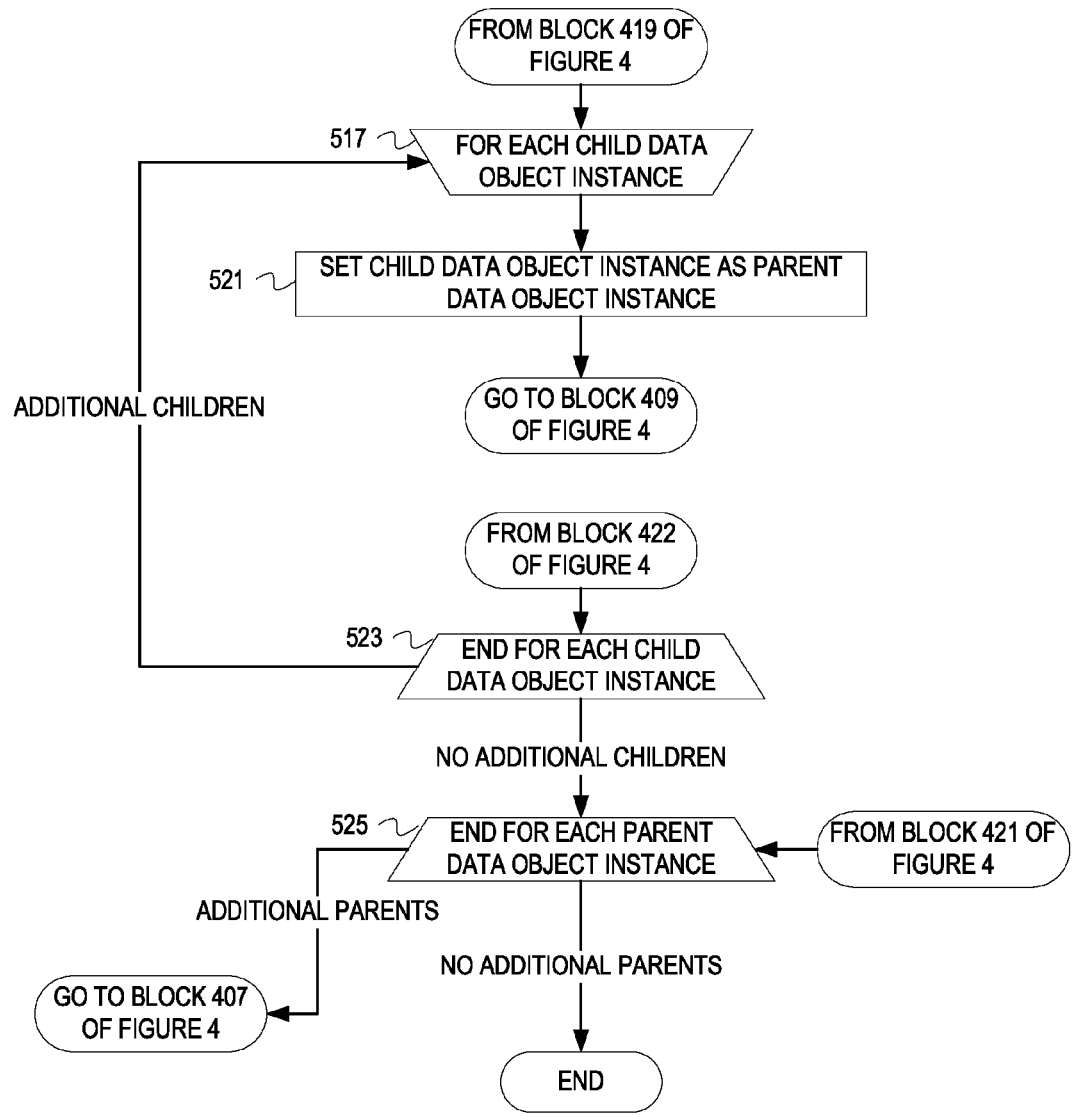

FIGS. 4 and 5 depict a flowchart of example operations for exporting a business object based on metadata. Flow begins at block 401, where a request to export a business object from a database is detected. For example, an export command is run. Flow continues at block 403.

At block 403, a metadata file and a filter are determined. In some examples, the metadata file may be determined manually based on user input (e.g., in response to a prompt). In other examples, the metadata file may be determined automatically based on input parameters of a script or a command. The filter can indicate which business object instances to export from the database based on an identifier of a root data object instance of each business object instance. For example, the filter comprises a list of business object instance names. Flow continues at block 405.

At block 405, an export file is created and extensions are written to the export file. An export file may include multiple extension types. For example, a run before extension and a run after extension may be written to the export file. A run before extension is a script that is run before importing business object instances, in the export file, into the database. A run after extension is a script that is run after importing business object instances, in the export file, into the database. Extensions can customize business object instances at import time. For example, a company with several office locations may have a business object called a recovery plan. The same recovery plan should be used at each office location. Rather than creating a recovery plan instance for each office location, extensions may be used to customize a single recovery plan instance for each office location at import. An extension can update attributes such as site manager contact details, location name, etc. Flow continues at block 406.

At block 406, parent data object instances to export are determined based on the filter and the metadata file. Determining the parents comprises locating a table containing data object instances based on location metadata of parents and searching the table for data object instance names indicated in the filter. Flow continues at block 407.

At block 407, a loop begins for each parent in the metadata file. Flow continues at block 409.

At block 409, metadata of the parent is written to the export file. Metadata may be copied from the metadata file to the export file. Metadata is written to the export file so that the export file contains the information (e.g., metadata, attributes of the data object instances, etc) used to import the business object intances at a later time. Flow continues at block 413.

At block 413, attributes of the parent are determined. For example, attributes are read from the columns in the table containing the parent. Flow continues at block 415.

At block 415, the attributes of the parent data object instance are written to the export file. Flow continues at block 411.

At block 417, children data object instances are determined based on the metadata file. Determining the children data object instances comprises determining children data object types of the parent data object type. Tables corresponding to the children data object types are located in the database. The tables are searched for data object instances indicating the parent data object instance as a parent. Although examples refer to representing database information in tables, embodiments are not so limited. For example, database information may be represented as objects, views, etc. Flow continues at block 419.

At block 419, it is determined if there are any children data object instances. If there are children, flow continues at block 517 of FIG. 5. If there are no children, flow continues at block 421.

At block 421, it is determined if this is a recursive call. If this is not a recursive call, flow continues at block 525 of FIG. 5. If this is a recursive call, flow continues at block 422.

At block 422, the calling instance of the function is resumed and flow continues at block 523 of FIG. 5.

FIG. 5 depicts a flowchart of example operations for exporting a business object based on metadata. Flow begins at block 517, where a loop begins for each child. Flow continues at block 521.

At block 521, the child is set as the parent. The function enters a recursive call at block 409 of FIG. 4.

At block 523, the loop for each child data object instance ends. If there are more children, flow returns to block 517. If there are no more children, flow continues at block 525.

At block 525, the loop for each parent ends. If there are more parents, flow returns to block 407 of FIG. 4. If there are no more parents, flow ends.

Data object instances are exported if the data object instances are indicated in the metadata file. If a child data object instance exists in the database, but not in the metadata file, the child data object instance is not exported. In addition, the child data object instance may not be exported if the child data object instance cannot be found in the database based on relationship metadata.

Figure 6:
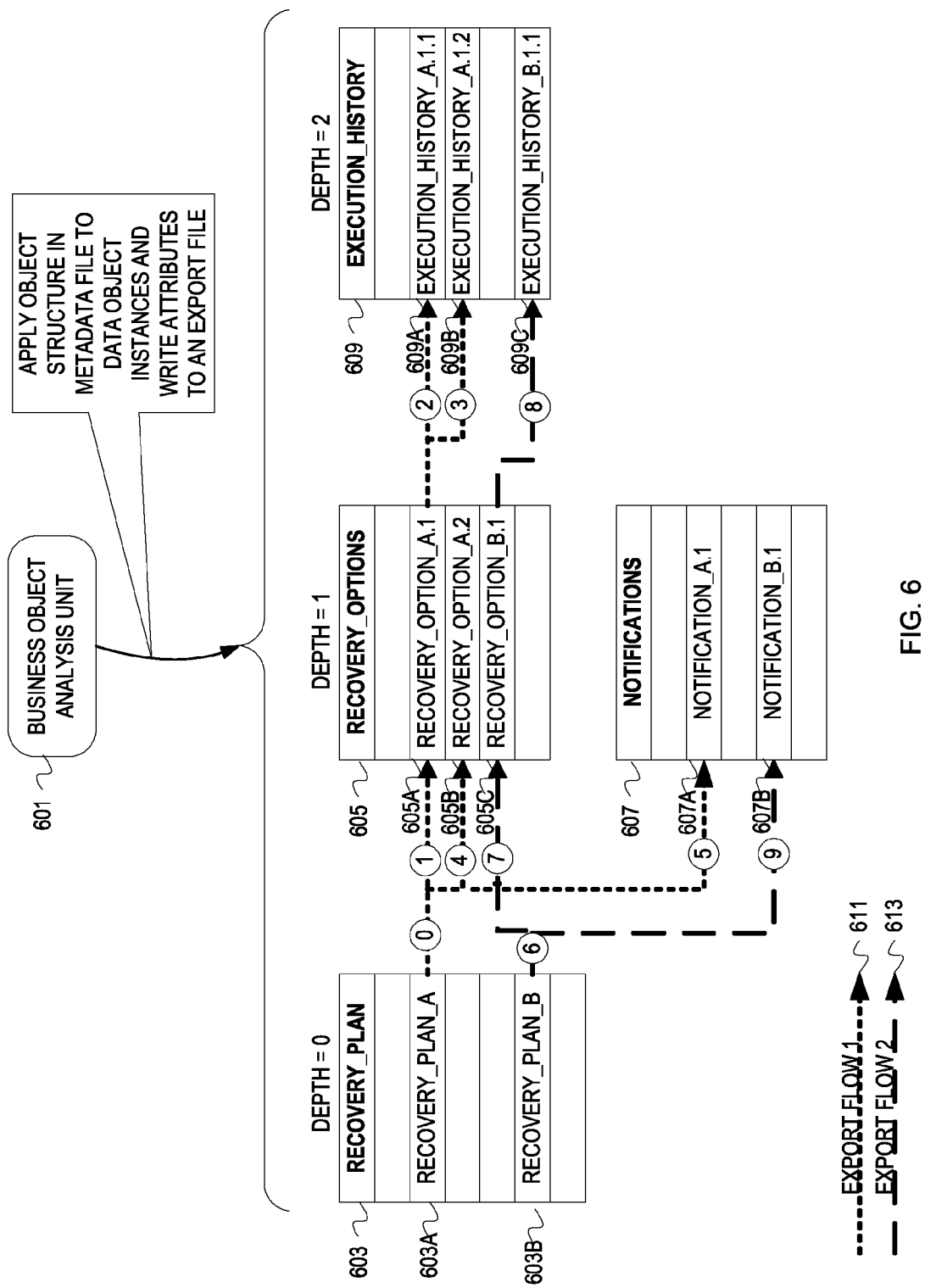
FIG. 6 is an example conceptual diagram of exporting business object instances from a database.

FIG. 6 is an example conceptual diagram of exporting business object instances from a database. A database comprises a "recovery_plan" table 603, a "recovery_options" table 605, a "notifications" table 607, and an "execution_history" table 609. The "recovery_plan" table 603 contains "recovery_plan" data object instances "recovery_plan_A" 603A, and "recovery_plan_B" 603B. The "recovery_options" table 605 contains "recovery_options" data object instances "recovery_option_A.1" 605A, "recovery_option_A.2" 605B, and "recovery_option_B.1" 605C. The "notifications" table 607 contains "notifications" data object instances "notification_A.1" 607A, and "notification_B.1" 607B. The "execution_history" table 609 contains "execution_history" data object instances "execution_history_A.1.1" 609A, "execution_history_A.1.2" 609B, and "execution_history_B.1.1" 609C.

A metadata file indicates that the "recovery_plan" 603 data object type is at a depth of zero, the "recovery_options" 605 and "notifications" 607 data object types are at a depth of one, and the "execution_history" 609 data object type is at a depth of two.

A business object analysis unit 601 applies object structure in the metadata file to data object instances and writes attributes of the data object instances to an export file. A filter indicates that data object instances "recovery_plan_A" 603A and "recovery_plan_B" 603B should be exported. The data object instances "recovery_plan_A" 603A and "recovery_plan_B" 603B represent root nodes of two business object instances. Export flow 1 611 and export flow 2 613 illustrate the order in which data objects are exported.

Export flow 1 611 begins at stage 0, where the data object instance "recovery_plan_A" 603A is exported and children of "recovery_plan_A" 603A are determined. The children comprise data object instances "recovery_option_A.1" 605A, "recovery_option_A.2" 605B, and "notification_A.1" 607A.

At stage 1, the data object instance "recovery_option_A.1" 605A is exported and children of "recovery_option_A.1" 605A are determined. The children comprise data object instances "execution_history_A.1.1" 609A, and "execution_history_A.1.2" 609B.

At stage 2, the data object instance "execution_history_A.1.1" 609A is exported and children of "execution_history_A.1.1" 609A are determined. The "execution_history_A.1.1" 609A does not have children data object instances. In this example, the metadata defines the business object "Recovery_plan" 603 up to a depth of two. In other examples, the metadata may define the business object to higher depths.

At stage 3, the data object instance "execution_history_A.1.2" 609B is exported and children of "execution_history_A.1.2" 609B are determined. The "execution_history_A.1.2" 609B does not have children data object instances.

At stage 4, the data object instance "recovery_option_A.2" 605B is exported and children of "recovery_option_A.2" 605B are determined. The "recovery_option_A.2" does not have children data object instances.

At stage 5, the data object instance "notification_A.1" 607A is exported and children of "notification_A.1" 607A are determined. The "notification_A.1" 607A does not have children data object instances.

Export flow 2 613 begins at stage 6, where the data object instance "recovery_plan_B" 603B is exported and children of "recovery_plan_B" 603B are determined. The children comprise data object instances "recovery_option_B.1" 605C, and "notification_B.1" 607B.

At stage 7, the data object instance "recovery_option_B.1" 605C is exported and children of "recovery_option_B.1" 605C are determined. The children comprise data object instance "execution_history_B.1.1" 609C.

At stage 8, the data object instance "execution_history_B.1.1" 609C is exported and children of "execution_history_B.1.1" 609C are determined. The "execution_history_B.1.1" 609C does not have children data object instances.

At stage 9, the data object instance "notification_B.1" 607B is exported and children of "notification_B.1" 607B are determined. The "notification_B.1" 607B does not have children data object instances.

Figure 7:
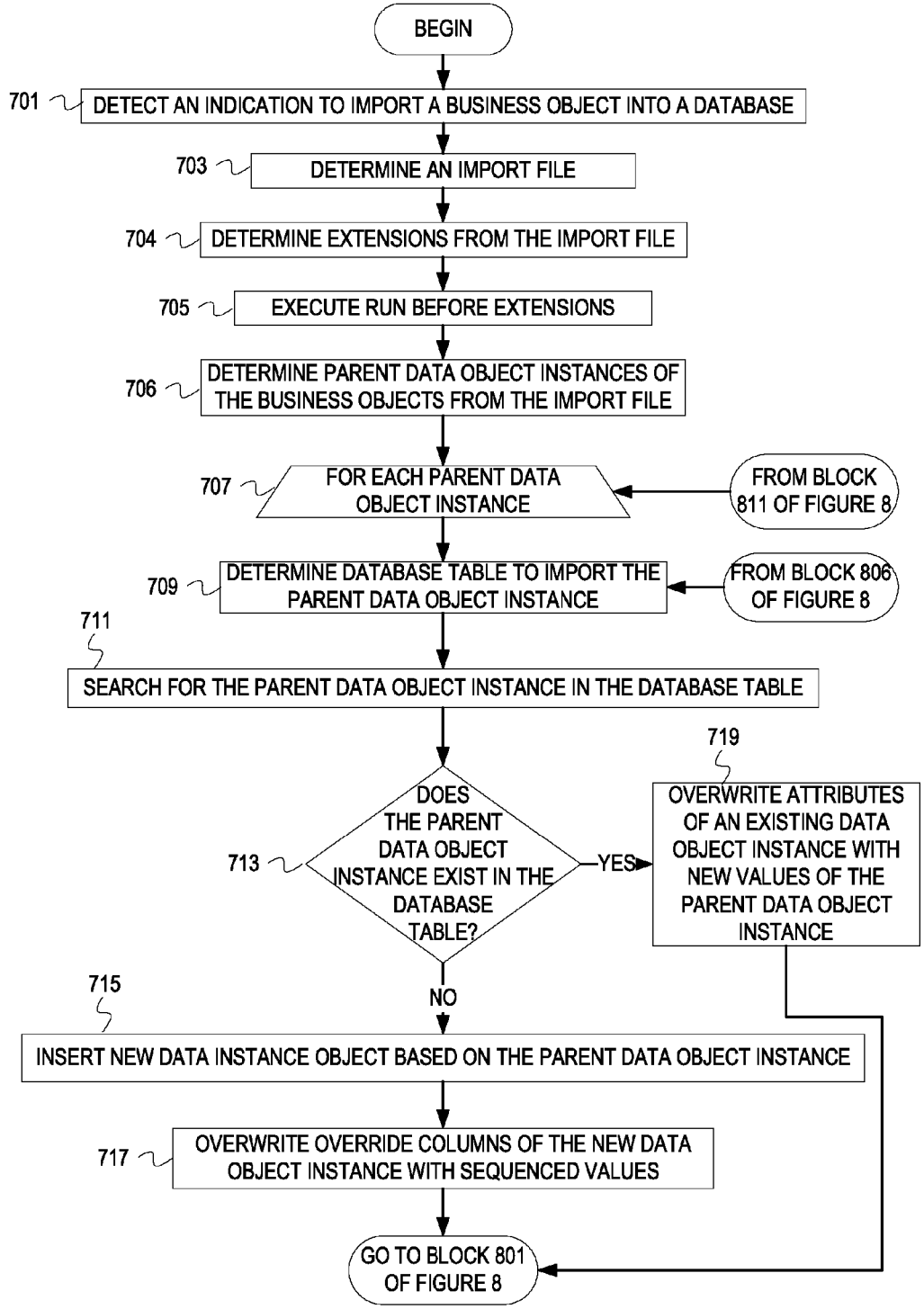
FIGS. 7 and 8 depict flowcharts of example operations for importing business object instances into a database.
Figure 8:
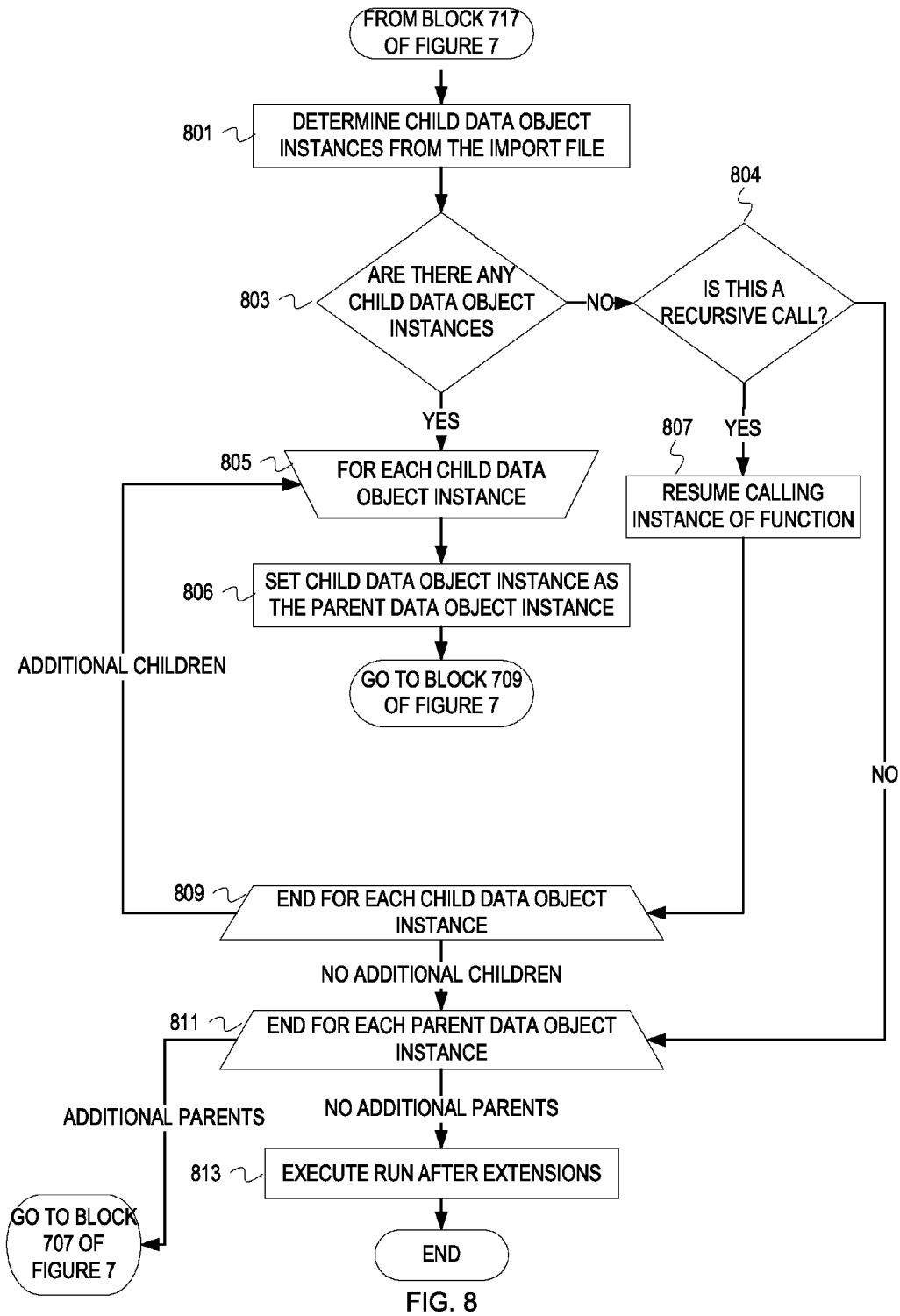

Export files may be delivered to a customer. The customer can then import the file into the customer's database. FIGS. 7 and 8 depict flowcharts of example operations for importing business object instances into a database. Flow begins at block 701, where an indication to import a business object instance into a database is detected. For example, a database command is run. Flow continues at block 703.

At block 703, an import file is determined. For example, the filename of the import file is an input to a database command. Flow continues at block 704.

At block 704, extensions are determined from the import file. Flow continues at block 705.

At block 705, run before extensions are executed. Run before extensions update business object instances before the business object instances are imported to the database. For example, a recovery_plan business object contains generic site location and manager attributes. Before importing the recovery_plan into the database, a run before extension can update the site location and manager attributes of a recovery_plan in the import file. As another example, the export file may be manipulated to ensure that the imported business object data does not violate any database constraints (e.g., unique indexes). Flow continues at block 706.

At block 706, parent data object instances of the business objects are determined from the import file. The parents correspond to root data object instances of each business object. Flow continues at block 707.

At block 707, a loop begins for each parent in the import file. Flow continues at block 709.

At block 709, a database table to import the parent is determined based on location metadata of the parent in the import file. Flow continues at block 711.

At block 711, the database table is searched for the parent. Flow continues at block 713.

At block 713, it is determined if the parent exists in the database table. Determining if the parent exists comprises determining if values in key columns of the parent, in the import file, match values in key columns of an existing data object instance in the database. Key columns specify which attributes (i.e., columns in a table) uniquely name data object instances in a database. If the parent does not exist in the database, flow continues at block 715. If the parent exists in the database, flow continues at block 719.

At block 715, a new data object instance based on the parent data object instance is inserted into the database. Flow continues at block 717.

At block 717, override columns of the new data object instance are overwritten with unique values. The unique values may be sequences of numbers, random hash keys, etc. The override columns are overwritten because the values in the import file may not be unique to the database. Flow continues at block 801 of FIG. 8.

At block 719, attributes of the existing data object instance are overwritten with new values of the parent data object instance because the parent existed in the database table. Flow continues at block 801 of FIG. 8.

FIG. 8 depicts a flowchart of example operations for importing business object instances into a database. Flow begins at block 801, where child data object instances are determined from the import file. Flow continues at block 803.

At block 803, it is determined if there are any children. If there are no children, flow continues at block 804. If there are children, flow continues at block 805.

At block 804, it is determined if this is a recursive call. If this is a recursive call, flow continues at block 807. If this is not a recursive call, flow continues at block 811.

At block 805, a loop begins for each child. Flow continues at block 807.

At block 806, the child is set as the parent. The function enters a recursive call begins at block 709 of FIG. 7.

At block 807, the calling instance of the function is resumed and flow continues at block 809.

At block 809, the loop for each child ends. If there are additional children, flow returns to block 805. If there are no additional children, flow continues at block 811.

At block 811, the loop for each parent ends. If there are additional parents, flow returns to block 707 of FIG. 7. If there are no additional parents, flow continues at block 813.

At block 813, run after extensions are executed and flow ends. Run after extensions update business object instances after the business object instances are imported to the database. For example, a recovery_plan business object contains generic site location and manager attributes. After importing the recovery_plan into the database, a run after extension can update the site location and manager attributes of a recovery_plan in the database. As another example, the run after extensions may update attributes that are unique identifiers to ensure the attributes are unique in the database.

Although generating metadata and exporting and importing business objects instances is described recursively, embodiments are not so limited. Embodiments may be implemented iteratively.

In addition to exporting a single business object, a group of dependent business objects ("a module") may be exported. For example, a "recovery_plan" business object may include a "recovery_option" data object instance that is related to "workflow" and "action" business objects. The "workflow" and "action" business objects may be used in multiple "recovery_option" data object instances. A module can be created that can contain the "recovery_plan" business object and its dependent "workflow" and "action" business objects. Modules can comprise a group of multiple metadata definitions and related filter statements ("export definitions"). A user may be unaware of the metadata definitions and filter statements in the export definitions, so a database management system may provide module definitions to allow a user to query modules by name.

Figure 9:
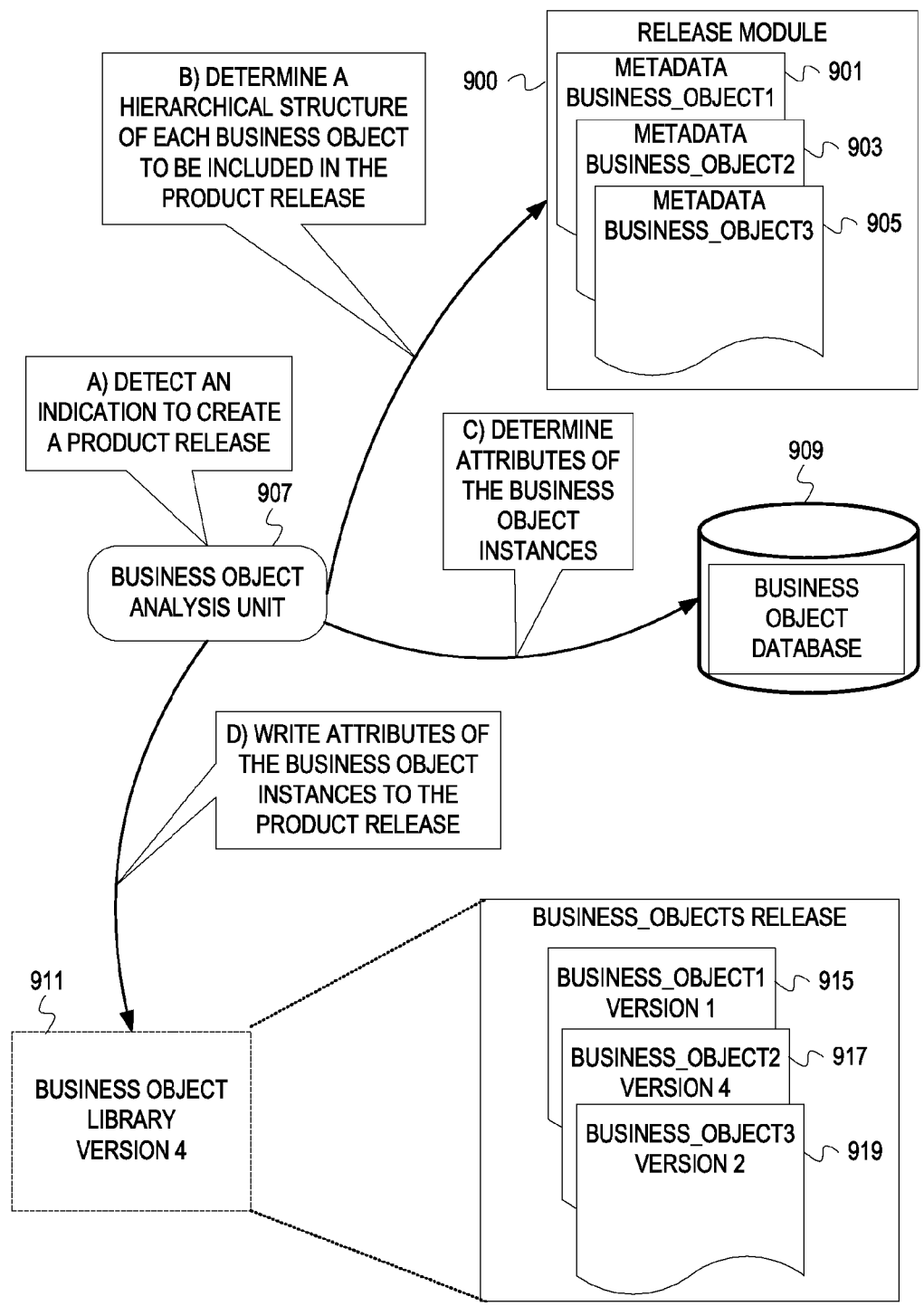
FIG. 9 is an example conceptual diagram of creating a product release.

Modules can be used to collect a plurality of business objects into a single product file to be delivered to a customer. FIG. 9 is an example conceptual diagram of creating a product release. At stage A, a business object analysis unit 907 detects an indication to create a product release. For example, a create product release wizard may be run.

At stage B, the business object analysis unit 907 determines a hierarchical structure of each business object to be included in the product release from a release module 900. The release module 900 can be determined based on the indication to create the product release in Stage A. Determining a hierarchical structure of each business object comprises determining metadata files for each business object. In this example, the metadata files are determined from the release module. In other examples, the metadata files may be specified by a user in response to a prompt in a create product release wizard or the metadata files may be determined from a script. In this example, the release module 900 indicates that three business objects, "business_object1," "business_object2," and "business_object3" are to be included in the product release. The business object analysis unit 907 determines that the structure of the business objects is defined in three metadata files 901, 903 and 905.

At stage C, the business object analysis unit 907 determines attributes of the business object instances from a business object database 909. Determining attributes of the business object instances from the business object database 909 comprises locating data object instances comprising the business object instances in the business object database 909 and reading attributes contained columns of the database tables containing the data object instances.

At stage D, the business object analysis unit 907 writes the attributes of the business object instances to the product release 911. In this example, the "business_objects release" 911 comprises three business object files, "business_object1 version 1" 915, "business_object2 version 4" 917 and "business_object3 version 2" 919. In other examples, multiple files describing each business object may be combined into a single product release file.

Stages C and D represent the flow depicted in FIGS. 4 and 5. The flow is completed for each business object to be included in the release.

As shown in FIG. 9, the product release 911 may comprise different versions of the business objects. This is due to the fact that business objects may be developed independently. Changes that are made to a single business object do not affect other business objects. However, the product release 911 version can be the same as the highest version of the business objects contained by the product release 911. In this example, the highest version is four for "business_object2 version 4" 917, so the version of the product release 911 is four. The product release 911 version may also be independent of the versions of the business objects in the product release 911.

Figure 10:
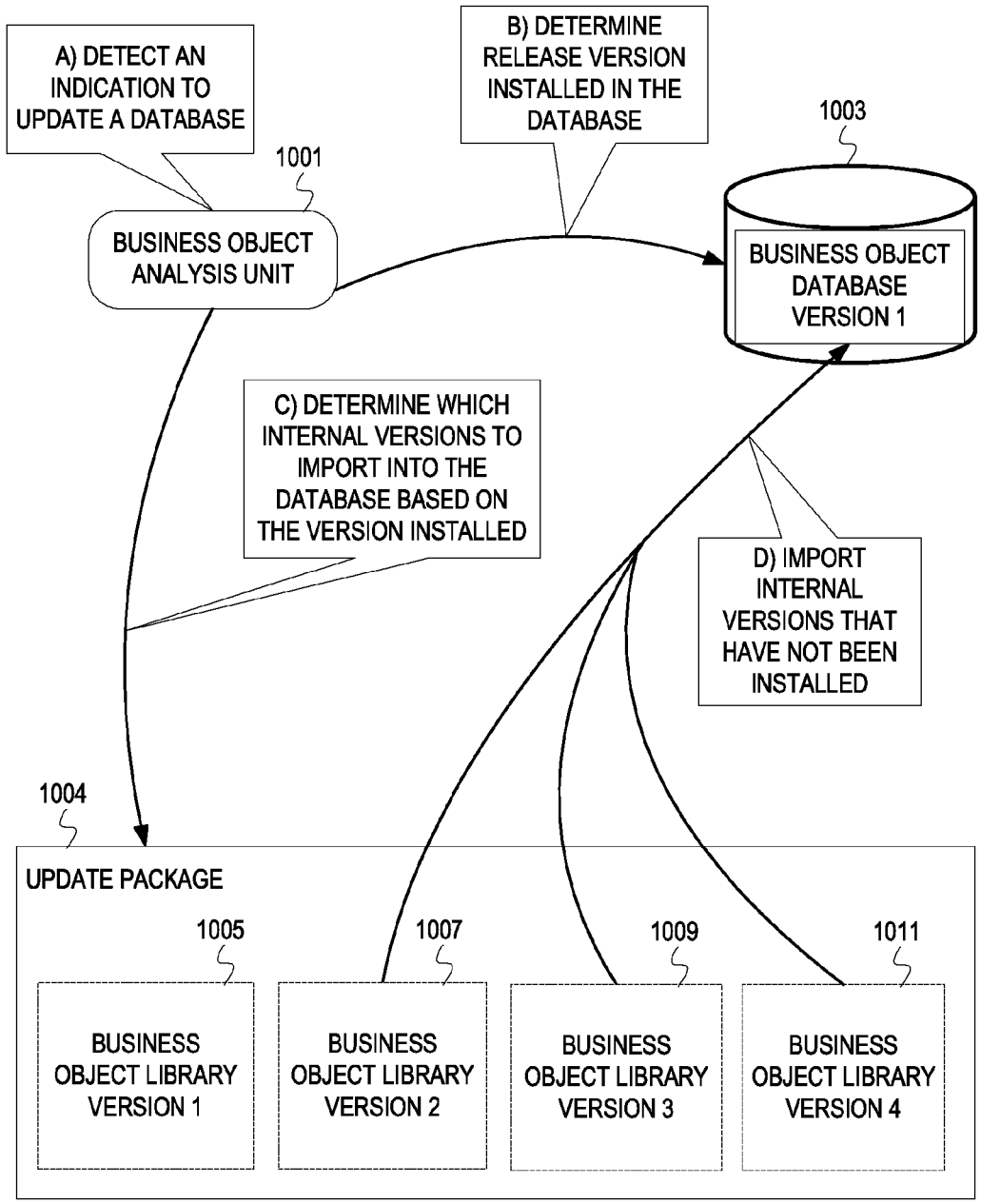
FIG. 10 is an example conceptual diagram of installing a new product release into a database.

FIG. 10 is an example conceptual diagram of installing a new product release into a database. At stage A, a business object analysis unit 1001 detects an indication to update a business object database 1003. For example, an upgrade toolkit is run.

At stage B, the business object analysis unit 1001 determines a release version installed in the business object database 1003. In this example, the installed version is one.

At stage C, the business object analysis unit 1001 determines which internal versions of the update package 1004 to import into the database based on the version installed in the business object database 1003.

At stage D, the business object analysis unit 1003 imports internal versions of the update package 1004 that have not been installed in the database 1003. In this example, the business object instances contained in "business object library version 2" 1007, "business object library version 3" 1009, and "business object library version 4" 1011 are imported into the business object database 1003. Stage D represents the flow of FIGS. 7 and 8. The flow is completed for each internal version to be imported into the database.

Figure 11:
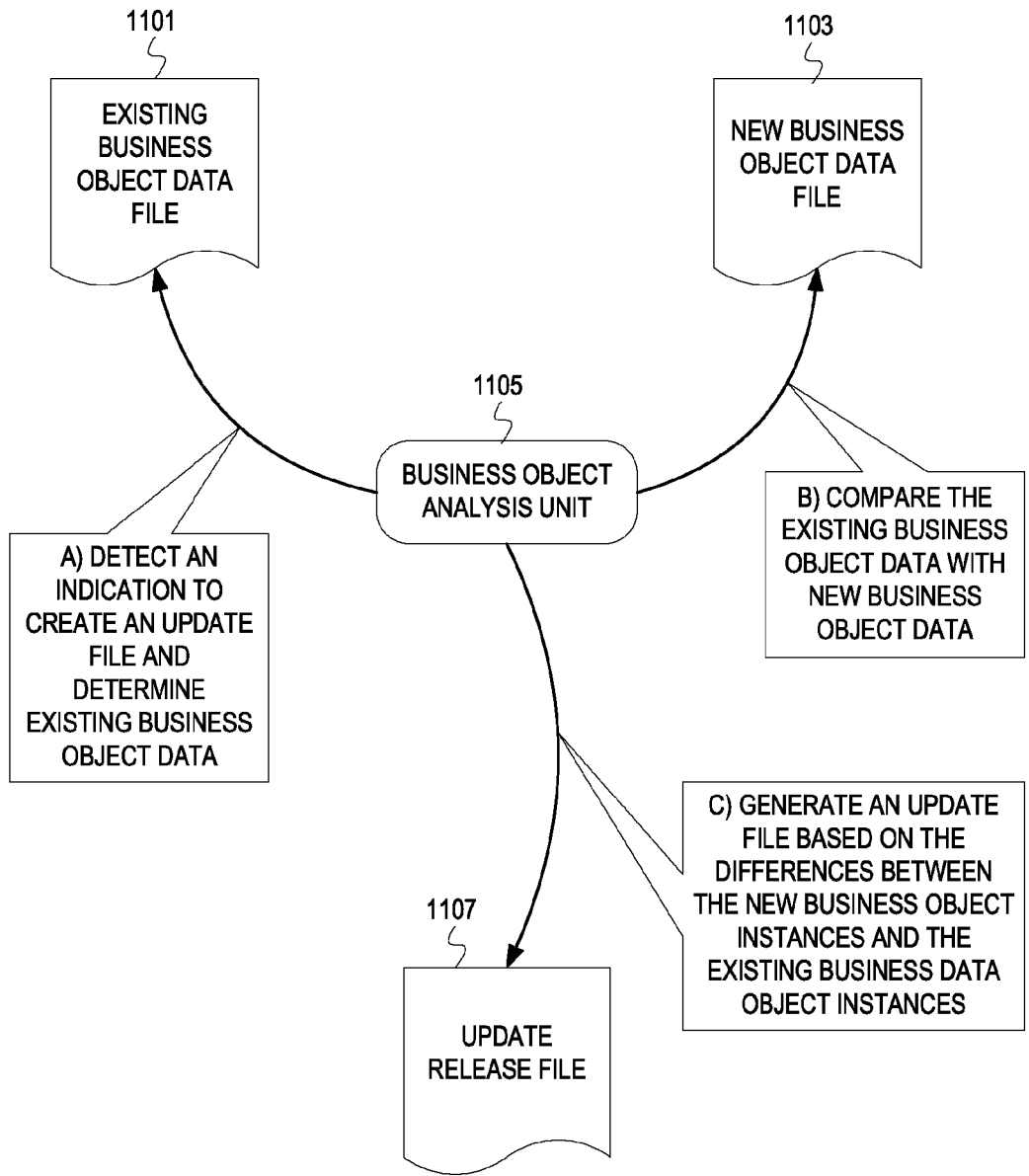
FIG. 11 is an example conceptual diagram of creating an update file representing the difference between two business object instance versions.

Instead of importing an entire business object instance when a few data object instances in the business object instance have changed, a file representing the changes may be generated. The generated file may be delivered to a customer so that it may be imported. FIG. 11 is an example conceptual diagram of creating an update file representing the difference between two business object instance versions. At stage A, a business object analysis unit 1105 detects an indication to create an update file and determines existing business object data from an existing business object data file 1101.

At stage B, the business object analysis unit 1105 compares the existing business object data with new business object data in the new business object data file 1103. Comparing the existing business object data with the new business object data comprises determining if each data object instance in the new business object data exists in the existing business object data. If the data object instance exists, the business object analysis unit 1105 determines if all attributes of the data objects are equal.

At stage C, the business object analysis unit 1105 generates an update file 1107 based on the differences between the new business object instances and the existing business data object instances. If a data object instance does not exist or an existing data object instance is different from the new data object instance, attributes of the new data object instance are written to the update file 1107.

The update file may be generated as a customer release. For example, the business object analysis unit 1105 compares the new business object data with existing business object data that is contained in an export file of a previous release version. The update file may also be generated during installation of a new product release version. For example, the business object analysis unit 1105 exports existing business object data from the database and compares the existing business object data with the new business object data to create the update file.

Figure 12:
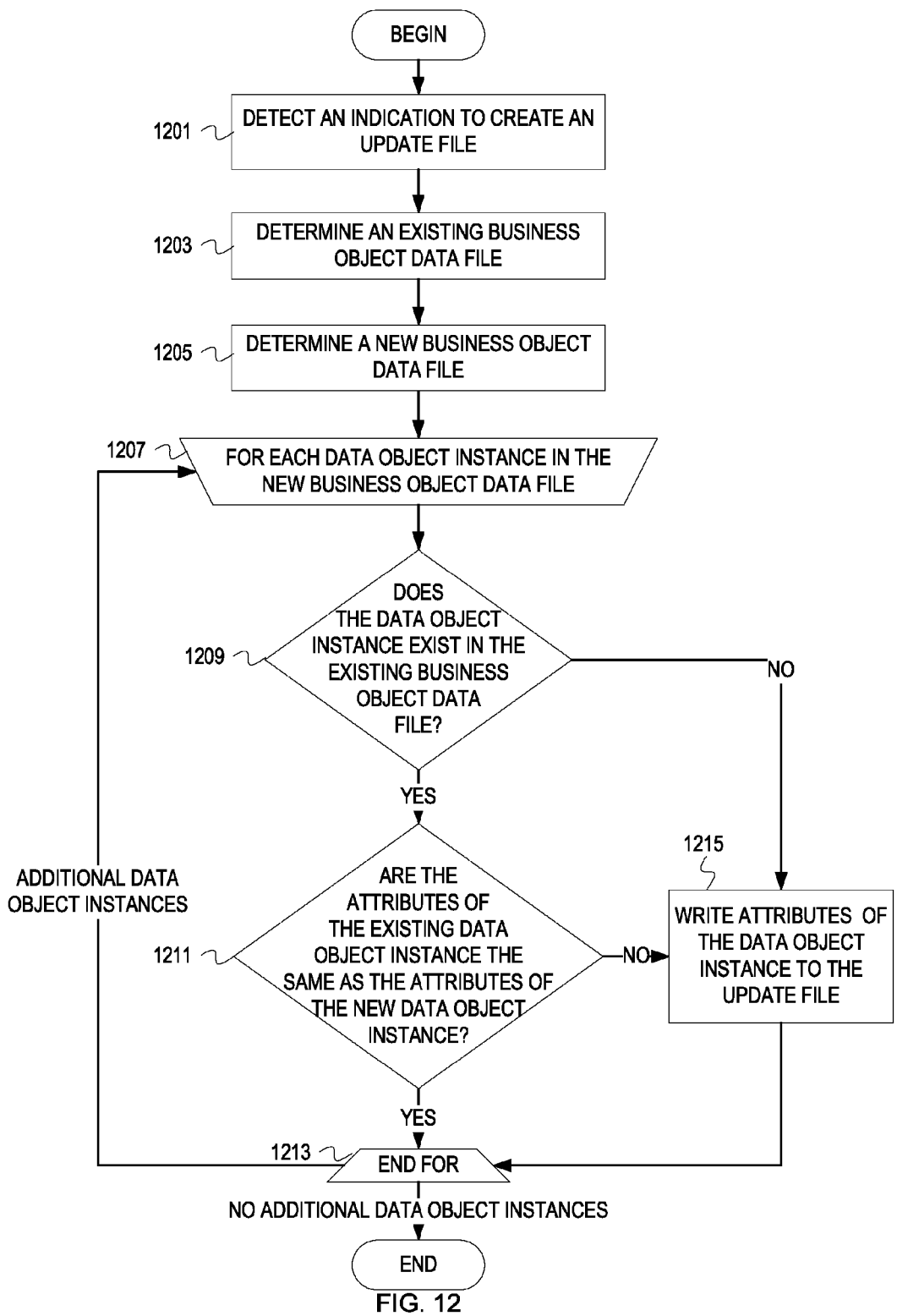
FIG. 12 is a flowchart depicting example operations for creating an update file.

FIG. 12 is a flowchart depicting example operations for creating an update file. Flow begins at block 1201, where an indication to create an update files is detected. For example, a database command is run. Flow continues at block 1203.

At block 1203, an existing business object data file is determined. For example, the existing business object data file is received as an input to a database command. As another example, the attributes of the business object instances are exported from a database and written into the existing business object data file. Flow continues at block 1205.

At block 1205, a new business object data file is determined. For example, the new business object data file is received as an input to a database command. Flow continues at block 1207.

At block 1207, a loop begins for each data object instance in the new business object data file. Flow continues at block 1209.

At block 1209, it is determined if the data object instance exists in the existing business object data file. If the data object instance exists, flow continues at block 1211. If the data object instance does not exist, flow continues at block 1215.

At block 1211, it is determined if the attributes of the existing data object instance are the same as the attributes of the new data object instance. If the attributes are the same, flow continues at block 1213. If the attributes are not the same, flow continues at block 1215.

At block 1213, the loop ends. If there are additional data object instances, flow returns to block 1207. If there are not additional data object instances, flow ends.

At block 1215, the attributes of the data object instance are written to the update release file and flow ends.

It should be understood that the depicted flowcharts are examples meant to aid in understanding embodiments and should not be used to limit embodiments or limit scope of the claims. Embodiments may perform additional operations, fewer operations, operations in a different order, operations in parallel, and some operations differently. For instance, the operations in FIG. 2 for determining metadata of the parent data object type and writing the metadata of the parent data object type to the metadata file may be performed in parallel. Referring to FIGS. 4 and 5, the operation for writing extensions to the export file in block 405 may be performed after block 525. Referring to FIG. 12, the operations for determining an existing business object data file and determining a new business object data file may be interchanged.

Embodiments may take the form of an entirely hardware embodiment, a software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 13:
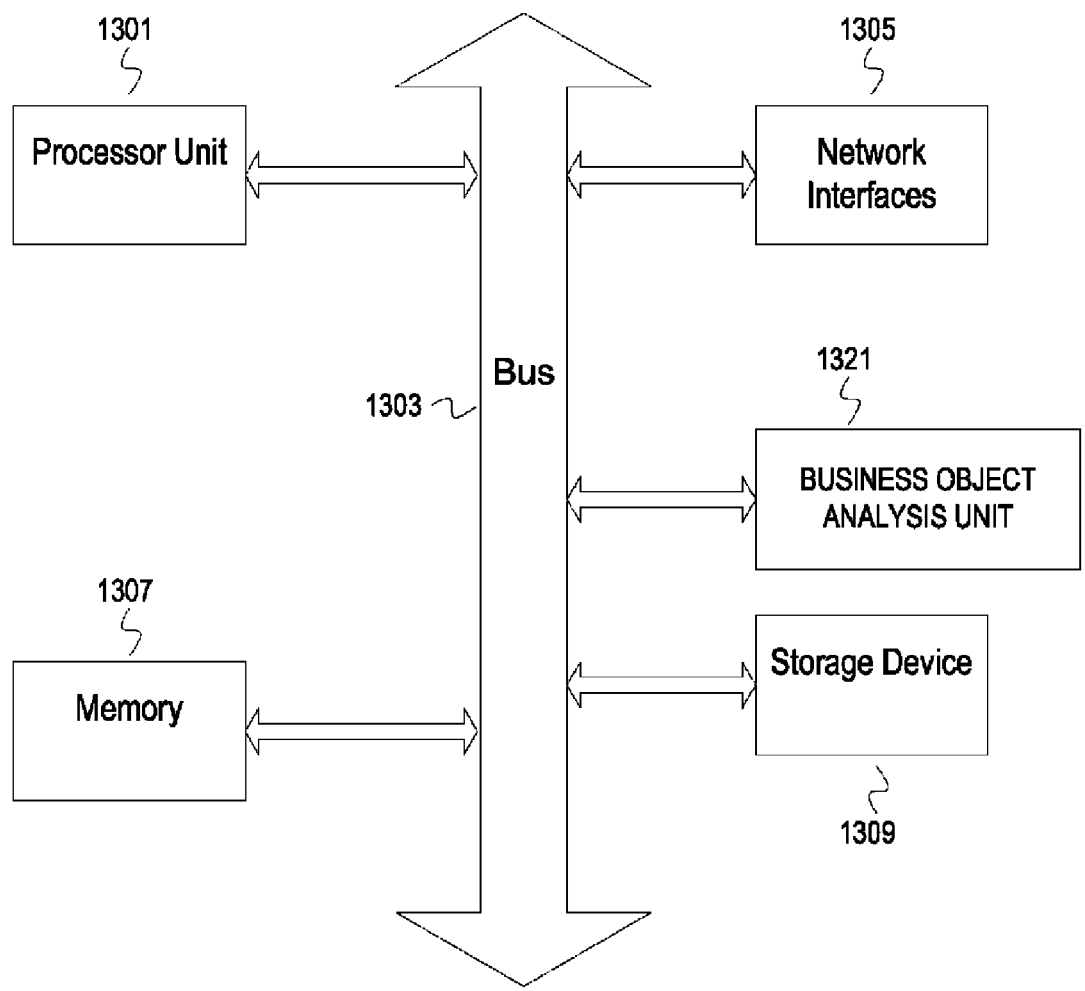
FIG. 13 depicts an example computer system.

FIG. 13 depicts an example computer system. A computer system includes a processor unit 1301 (possibly including multiple processors, multiple cores, multiple nodes, and/or implementing multi-threading, etc.). The computer system includes memory 1307. The memory 1307 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 1303 (e.g., PCI, ISA, PCI-Express, HyperTransport®, InfiniBand®, NuBus, etc.), a network interface 1305 (e.g., an ATM interface, an Ethernet interface, a Frame Relay interface, SONET interface, wireless interface, etc.), and a storage device(s) 1309 (e.g., optical storage, magnetic storage, etc.). The computer system also includes a business object analysis unit 1321 that exports and imports business data objects based on generated metadata. Any one of these functionalities may be partially (or entirely) implemented in hardware and/or on the processing unit 1301. For example, the functionality may be implemented with an application specific integrated circuit, in logic implemented in the processing unit 1301, in a co-processor on a peripheral device or card, etc. Further, realizations may include fewer or additional components not illustrated in FIG. 13 (e.g., video cards, audio cards, additional network interfaces, peripheral devices, etc.). The processor unit 1301, the storage device(s) 1309, and the network interface 1305 are coupled to the bus 1303. Although illustrated as being coupled to the bus 1303, the memory 1307 may be coupled to the processor unit 1301.

While the embodiments are described with reference to various implementations and exploitations, it will be understood that these embodiments are illustrative and that the scope of the inventive subject matter is not limited to them. In general, techniques for exporting and importing business objects based on metadata as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   detecting an indication to create a metadata file for a business object in a first database, wherein the metadata file indicates the hierarchical structure of interrelated data object types that constitute the business object and indicates relationships among the data object types;
   determining a root data object type in a tree data structure representing the business object and a maximum depth, wherein the maximum depth represents a maximum level of the hierarchical structure for which metadata should be collected;
   traversing each data object type of the tree data structure beginning at the root data object type;
   locating each data object type in the first database;
   determining metadata of each data object type from the first database;
   recording metadata of each data object type to the metadata file;
   detecting a request to export the business object from the first database;
   determining the metadata file for the business object and a filter, wherein the filter indicates which business object instances of the business object to export;
   creating an export file;
   writing extensions to the export file, wherein extensions are scripts that customize business object instances during import;
   determining a first business object instance based on the filter;
   determining a first parent data object instance corresponding to the first business object instance based on the metadata;
   determining attributes of the first parent data object instance;
   writing the attributes and metadata of the first parent data object instance to the export file;
   determining a plurality of children data object instances based on the metadata file;
   determining attributes of the each of the plurality of children data object instances; and
   writing the attributes and metadata of each of the plurality of children data object instances to the export file.

2. The method of claim 1, wherein the metadata comprises at least one of a name, a location in the first database, a key column, an override column, a relationship, and an extension.

3. A method comprising:
   creating a metadata file for a business object in a first database wherein the metadata file indicates the hierarchical structure of interrelated data object types that constitute the business object and indicates relationships among the data object types;
   detecting a request to export the business object from the first database;
   determining the metadata file for the business object and a filter, wherein the filter indicates which business object instances of the business object to export;
   creating an export file;
   writing extensions to the export file, wherein extensions are scripts that customize business object instances during import;
   determining a first business object instance based on the filter;
   determining a first parent data object instance corresponding to the first business object instance based on the metadata;
   determining attributes of the first parent data object instance;
   writing the attributes and metadata of the first parent data object instance to the export file;
   determining a plurality of children data object instances based on the metadata file;
   determining attributes of the each of the plurality of children data object instances; and
   writing the attributes and metadata of each of the plurality of children data object instances to the export file.

4. The method of claim 3, wherein said determining a plurality of parent data object instances corresponding to the business object instances based on the metadata further comprises:
   locating a first table, in the first database, corresponding to the parent data object types based on the metadata; and
   searching the first table for the business object instances indicated in the filter.

5. The method of claim 3, wherein said determining a plurality of children data object instances based on the metadata file further comprises:
   determining a plurality of children data object types of the parent data object type based on the metadata;
   locating a plurality of tables, in the first database, corresponding to the plurality children data object types based on the metadata; and
   searching the plurality of tables for data object instances indicating the parent data object instance as a parent.

6. The method of claim 3 further comprising:
   detecting an indication to import the business object into a second database;
   determining extensions from the export file;
   executing run before extensions, wherein run before extensions update the business object instances before the business object instances are imported into the second database;

determining the first parent data object instance of the business object from the export file;

determining a second table, in the second database, in which to import the first parent data object instance based on metadata of the first parent data object instance in the export file;

searching the second table for the first parent data object instance;

determining that the first parent data object instance exists in the second table;

overwriting attributes of an existing data object instance with attributes of the first parent data object instance;

determining a first child data object instance from the export file;

determining a third table, in the second database, in which to import the first child data object instance based on metadata of the plurality of the first child data object instances in the export file;

searching the third table for the first child data object instance;

determining that the first child data object instance does not exist in the third table; and inserting the first child data object instance into the third table.

7. The method of claim 6, wherein said inserting the first child data object instance in the third table further comprises overwriting override columns of the inserted data object instance with unique values.

8. A computer program product comprising a tangible computer storage medium having computer usable code stored thereon, wherein the computer usable code, when executed on a computing device, causes the computing device to:

detect an indication to create a metadata file for a business object in a first database, wherein the metadata file indicates the hierarchical structure of interrelated data object types that constitute the business object and indicates relationships among the data object types;

determine a root data object type in a tree data structure representing the business object and a maximum depth, wherein the maximum depth represents a maximum level of the hierarchical structure for which metadata should be collected;

traverse each data object type of the tree data structure beginning at the root data object type;

locate each data object type in the first database;

determine metadata of each data object type from the first database;

record metadata of each data object type to the metadata file;

detect a request to export the business object from the first database;

determine the metadata file for the business object and a filter, wherein the filter indicates which business object instances of the business object to export;

create an export file;

write extensions to the export file, wherein extensions are scripts that customize business object instances during import;

determine a first business object instance based on the filter;

determine a first parent data object instance corresponding to the first business object instance based on the metadata;

determine attributes of the first parent data object instance;

write the attributes and metadata of the first parent data object instance to the export file;

determine a plurality of children data object instances based on the metadata file;

determine attributes of the each of the plurality of children data object instances; and write the attributes and metadata of each of the plurality of children data object instances to the export file.

9. The computer program product of claim 8, wherein the metadata comprises at least one of a name, a location in the first database, a key column, an override column, a relationship, and an extension.

10. A computer program product comprising a tangible computer storage medium having computer usable code stored thereon, wherein the computer usable code, when executed on a computing device, causes the computing device to:

create a metadata file for a business object in a first database wherein the metadata file indicates the hierarchical structure of interrelated data object types that constitute the business object and indicates relationships among the data object type;

detect a request to export the business object from the first database;

determine the metadata file for the business object and a filter, wherein the filter indicates which business object instances of the business object to export;

create an export file;

write extensions to the export file, wherein extensions are scripts that customize business object instances during import;

determine a first business object instance based on the filter;

determine a first parent data object instance corresponding to the first business object instance based on the metadata;

determine attributes of the first parent data object instance;

write the attributes and metadata of the first parent data object instance to the export file;

determine a plurality of children data object instances based on the metadata file;

determine attributes of the each of the plurality of children data object instances; and write the attributes and metadata of each of the plurality of children data object instances to the export file.

11. The computer program product of claim 10, wherein said computer usable program code being configured to determine a plurality of parent data object instances corresponding to the business object instances based on the metadata comprises the computer usable code being configured to:

locate a first table, in the first database, corresponding to the parent data object types based on the metadata; and search the first table for the business object instances indicated in the filter.

12. The computer program product of claim 10, wherein said computer usable program code being configured to determine a plurality of children data object instances based on the metadata file comprises the computer usable code being configured to:

determine a plurality of children data object types of the parent data object type based on the metadata;

locate a plurality of tables, in the first database, corresponding to the plurality children data object types based on the metadata; and search the plurality of tables for data object instances indicating the parent data object instance as a parent.

13. The computer program product of claim 10, wherein the computer usable code is further configured to:
- detect an indication to import the business object into a second database;
- determine extensions from the export file;
- execute run before extensions, wherein run before extensions update the business object instances before the business object instances are imported into the second database;
- determine the first parent data object instance of the business object from the export file;
- determine a second table, in the second database, in which to import the first parent data object instance based on metadata of the first parent data object instance in the export file;
- search the second table for the first parent data object instance;
- determine that the first parent data object instance exists in the second table;
- overwrite attributes of an existing data object instance with attributes of the first parent data object instance;
- determine a first child data object instance from the export file;
- determine a third table, in the second database, in which to import the first child data object instance based on metadata of the plurality of the first child data object instances in the export file;
- search the third table for the first child data object instance;
- determine that the first child data object instance does not exist in the third table; and
- insert the first child data object instance into the third table.

14. The computer program product of claim 13, wherein said computer usable program code being configured to insert the first child data object instance in the third table comprises the computer usable code being configured to overwrite override columns of the inserted data object instance with unique values.

15. An apparatus comprising:
- a processing unit; and
- a memory coupled to the processing unit, wherein the memory comprises instructions which, when executed by the processing unit, cause the processing unit to:
- detect an indication to create a metadata file for a business object in a first database, wherein the metadata file describes the hierarchical structure of interrelated data object types that constitute the business object and relationships between the data object types;
- determine a root data object type of the business object and a maximum depth, wherein the maximum depth represents a maximum level of the hierarchical structure for which metadata should be collected;
- collect metadata of the root data object type;
- write the metadata of the root data object type to the metadata file;
- determine that the maximum depth has not been reached;
- determine a plurality of children data object types;
- collect metadata of the children data object types;
- write the metadata of the children data object types to the metadata file;
- detect a request to export the business object from the first database;
- determine the metadata file for the business object and a filter, wherein the filter indicates which business object instances of the business object to export;
- create an export file;
- write extensions to the export file, wherein extensions are scripts that customize business object instances during import;
- determine a first business object instance based on the filter;
- determine a first parent data object instance corresponding to the first business object instance based on the metadata;
- determine attributes of the first parent data object instance;
- write the attributes and metadata of the first parent data object instance to the export file;
- determine a plurality of children data object instances based on the metadata file;
- determine attributes of the each of the plurality of children data object instances; and
- write the attributes and metadata of each of the plurality of children data object instances to the export file.

16. An apparatus comprising:
- a processing unit; and
- a memory coupled to the processor, wherein the memory comprises instructions which, when executed by the processor, cause the processor to:
- create a metadata file for a business object in a first database wherein the metadata file indicates the hierarchical structure of interrelated data object types that constitute the business object and indicates relationships among the data object types;
- detect a request to export the business object from the first database;
- determine the metadata file for the business object and a filter, wherein the filter indicates which business object instances of the business object to export;
- create an export file;
- write extensions to the export file, wherein extensions are scripts that customize business object instances during import;
- determine a first business object instance based on the filter;
- determine a first parent data object instance corresponding to the first business object instance based on the metadata;
- determine attributes of the first parent data object instance;
- write the attributes and metadata of the first parent data object instance to the export file;
- determine a plurality of children data object instances based on the metadata file;
- determine attributes of the each of the plurality of children data object instances; and
- write the attributes and metadata of each of the plurality of children data object instances to the export file.

17. The apparatus of claim 16, wherein said determining a plurality of parent data object instances corresponding to the business object instances based on the metadata further comprises:
- locating a first table, in the first database, corresponding to the parent data object types based on the metadata; and
- searching the first table for the business object instances indicated in the filter.

18. The apparatus of claim 16, wherein said determining a plurality of children data object instances based on the metadata file further comprises:
- determining a plurality of children data object types of the parent data object type based on the metadata;
- locating a plurality of tables, in the first database, corresponding to the plurality children data object types based on the metadata; and
- searching the plurality of tables for data object instances indicating the parent data object instance as a parent.

* * * * *